Jan. 9, 1934.  W. G. LERCH  1,943,272
TIRE BEAD
Filed July 22, 1931

INVENTOR.
William G. Lerch
BY
Ray Oberlin & Ray
ATTORNEYS.

Patented Jan. 9, 1934

1,943,272

UNITED STATES PATENT OFFICE 1,943,272

TIRE BEAD

William G. Lerch, Akron, Ohio, assignor, by direct and mesne assignments, to National-Standard Company, Niles, Mich., a corporation of Michigan Application July 22, 1931. Serial No. 552,401

12 Claims. (Cl. 154—14)

This invention relates to the manufacture of automobile and other pneumatic tires and particularly to the construction of reenforced beads for such tires.

In the previously known bead formation the practice has been to insert reenforcing wires by first arranging such wires side by side in the form of a tape held together by a coating of rubber composition or else to use metallic strands built up by weaving, sometimes in the form of a flat braid and sometimes in the form of a twisted or weftbound cable. All of these methods and their various modifications have been unsatisfactory for the reason that in practice it has been impossible with tape or braid to arrange the reenforcing elements throughout the stages of manufacture in the regular and predetermined arrangement desired, so as to form a properly disposed skeletal reenforcement correctly related to the final shape of the bead and at the same time in which all the elements of the reenforcement contributed equally and directly to the strengthening of the bead.

More in detail, the type of reenforcement comprising a plurality of separate wires arranged in superposed flat tapes has proven objectionable because of the fact that the final cross-sectional form of the beads is that of a triangle, usually a right triangle, whereas the superposed group of flat tapes is square in cross section. In changing the bead to the triangular form the individual wires assume an irregular arrangement, particularly where the upper outer corner of the tape group is pressed back along the hypotenuse of the triangle of the finished bead with the result that along this corner the wires remain too close to the surface and tend to work out and impair the wearing qualities of the bead. On the other hand, the hitherto known arrangements of reenforcing wires built up in triangular cross-section have necessitated the use of auxiliary binding wires and similar objectionable features adding to the expense of manufacture.

With the object of eliminating these various disadvantages and of providing a structure characterized by simplicity, uniform distribution of reenforcing elements, adaptability to various sizes, and long life, I have invented the tire bead and method of making the same illustrated by the preferred embodiment in the following specification and accompanying drawing.

Figure 1:
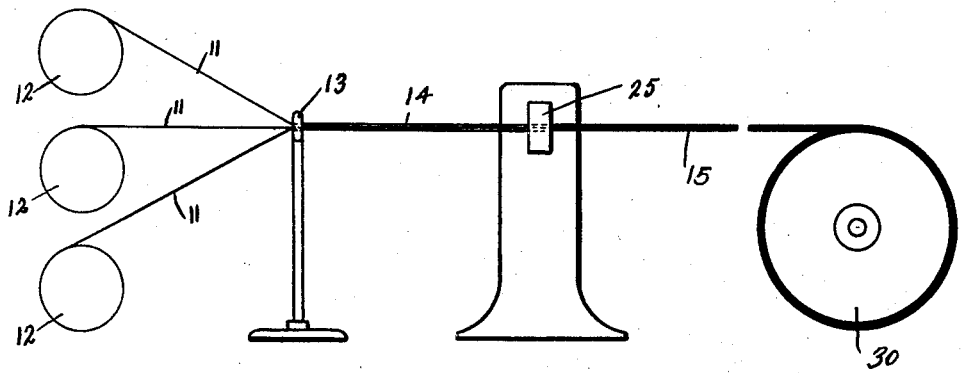
Figure 2:
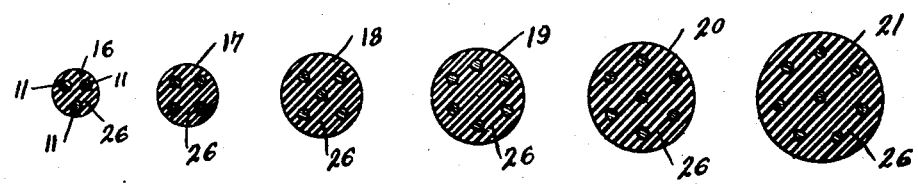
Figure 3:
Figure 4:
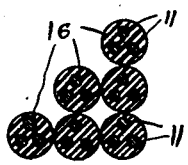
Figure 5:
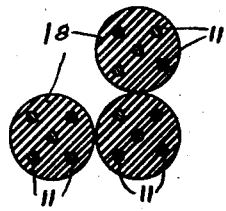
Figure 6:
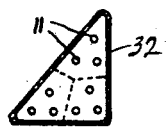
Figure 7:
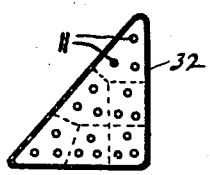

In the drawing, Fig. 1 is a diagrammatic side elevation of a machine for forming the individual reenforcing cable and the bead; Fig. 2 illustrates a variety of forms of such cables of various sizes; Figs. 3, 4 and 5 illustrate cross sections through various lay-ups of cables in a formative stage; and Figs. 6 and 7 show diagrammatic cross sections through completed beads corresponding to Figs. 3 and 4 respectively.

In the preferred method of manufacture I pass a plurality of bare reenforcing wires 11 from suitable sources of supply such as the reels 12 through a forming ring 13 thereby grouping the wires 11 as shown at 14 into the parallel relation which they are to retain in the finished reenforcing cable such as 16 to 21, Fig. 2. The group of parallel wires 14 then passes through a die former and insulating head 25 where each is coated with a plastic compound 26, unvulcanized rubber being the material ordinarily used. Due to the fact that the rubber is applied soft and that the wires of the group are pressed closely together, the coating 26 flows together between and around the wires, as shown in Fig. 2, making a solid rubber and wire cable. The wires 11 in the cable of whatever size are not twisted relatively to one another, but are maintained parallel throughout their length. Thus the reenforcing cable indicated as 15 in Fig. 1, is formed. It is understood that this cable will be of any of the forms from 16 to 21 inclusive, or of other similar form according to the number of wires 11 used and the arrangement into which they are brought by the die former 25.

The cable formed from the individual wires is drawn from the die former 25 to a bead former 30, whereon the bead is laid up in turns and layers, the cable turns of each layer being placed against each other and the layers being placed one above the other with the corresponding turn of each layer approximately above the turn below, all as shown in Figs. 3, 4 and 5. Each layer is narrowed by having fewer outer turns than the next below, each usually containing one turn less than the next lower and the turns and layers form one continuous cable. Thus, as apparent from Figs. 3, 4 and 5, the reenforcement consists of parallel cable turns 15 such as any of those in Fig. 2, these cable turns being laid up so that a transverse section through the cable turns laid up ready to be compressed into a bead shows a right triangle arrangement of cable turns regularly placed, such cable turns including corner reenforcement. Thus, if it were not for the top single turn in Fig. 4, for example, it would be necessary to use a wedge-shaped rubber filler in its place. This would not have any reenforcing strength. Beads for tires of various sizes can be made either by varying the size of the cables or the number of cable turns or both. For example, in Figs. 3 and 5, the same number of cable turns is used, but of different sizes, 16 and 18, respectively, whereas in Figs. 3 and 4, the same size of cables 16 is used, but a different number of turns.

After the cable turns are laid up as in Figs. 3, 4 and 5, the usual fabric covering 32 is applied and when the tire is vulcanized the cable turns are compressed into the final bead form so as to fill all voids completely. This compression results in a cross-sectional arrangement somewhat as shown in Figs. 6 and 7 where the dotted lines indicate diagrammatically the areas filled by each original cable. In these figures the usual cross-hatching is intentionally omitted since it would obscure the dotted lines. It will be observed that this compression causes some change in position of the wires 11, but this change in position is unimportant, since each wire moves only within its own group and the relation of the groups does not change.

The number of cable turns and their size, as well as the number of wires in each cable turn, depends upon the size of the tire to which the bead belongs, the strength of reenforcement necessary and other factors, all within the control of the manufacturer.

The foregoing specification is intended as an illustration of the process of making my improved bead, and of the bead itself, and not as a limitation upon the invention. Variations may be made in any particulars within the spirit and scope of the invention as set forth in the following claims.

What I claim is:

1. A method of reenforcing tire beads which comprises the successive steps of grouping a plurality of bare wires in untwisted generally cylindrical individually spaced arrangement, surrounding said wires with rubber composition to form a cable and arranging said cable in turns in side by side relation in successive superposed layers of regularly diminishing width.

2. A method of forming material for the reenforcement of tire beads which comprises grouping a plurality of bare wires into generally cylindrical paraxial arrangement and fixing them in said arrangement by coating each of said wires with a sticky plastic composition and compacting them, whereby the sticky properties of said composition hold them together.

3. A method of making reenforced tire beads which comprises forming distinct groups of wires, said wires being individually spaced, into distinct rubber-covered cable turns, winding said cable turns on a bead former in flat layers concentric with the base of the bead, said layers successively upwardly diminishing in width.

4. A method of forming material for the reinforcement of tire beads which comprises grouping a plurality of bare wires into generally cylindrical paraxial spaced arrangement and fixing them in said arrangement by coating each of said wires with a sticky plastic composition and compacting them, whereby the sticky properties of said composition hold them together, and then compacting said groups into bead form.

5. A method of making reenforced tire beads which comprises forming distinct groups of wires into a distinct rubber-covered cable, winding said cable on a bead former in flat layers concentric with the base of the bead, said layers successively upwardly diminishing in width.

6. A method of making reenforced tire beads which comprises forming distinct groups of wires into a distinct rubber-covered cable, winding said cable on a bead former in flat layers concentric with the base of the bead, said layers successively upwardly diminishing in width, the top layer consisting of a single turn of the cable.

7. A method of making reenforced tire beads which comprises forming wires into a distinct group, maintaining such group in a supporting material, winding said group on a bead former in flat layers of successively upwardly diminishing width, and compressing said group turns into compact relationship without materially altering the relation within the group turns.

8. A method of making reenforced tire beads which comprises forming distinct groups of wires into a distinct rubber-covered cable, winding said cable on a bead former in flat layers concentric with the base of the bead, the inner edges of all layers being in a common plane perpendicular to the base, and the outer edge being retracted from the outer edge of the layer below by the omission of a cable turn.

9. A round cable for tire beads comprising a plurality of wires in parallel arrangement and a rubber covering thereon.

10. An intermediate product in the formation of a tire bead comprising a cable of separate wires and a rubber covering, said cable being wound side by side in layers and upon itself in successive layers.

11. A tire bead reinforcement comprising a plurality of groups of parallel wires, each group having a surrounding coating of plastic composition, said groups being placed in generally triangular arrangement as viewed in cross-section.

12. A tire bead reinforcement comprising a plurality of layers of cables, said layers narrowing from base to apex of the bead, as seen in cross-section.

WILLIAM G. LERCH.